July 19, 1949.  W. D. BOYNTON  2,476,278
APPARATUS FOR TESTING CONDUCTORS
Filed Oct. 3, 1944  2 Sheets-Sheet 1

INVENTOR
W. D. BOYNTON
BY
ATTORNEY

July 19, 1949.  W. D. BOYNTON  2,476,278
APPARATUS FOR TESTING CONDUCTORS
Filed Oct. 3, 1944  2 Sheets-Sheet 2
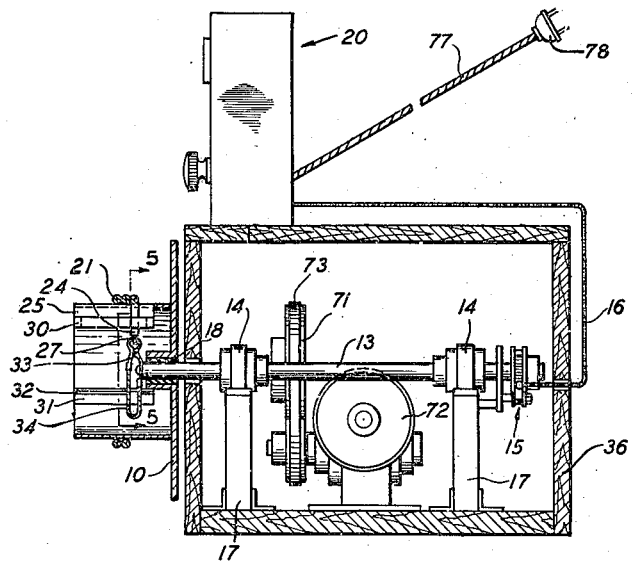
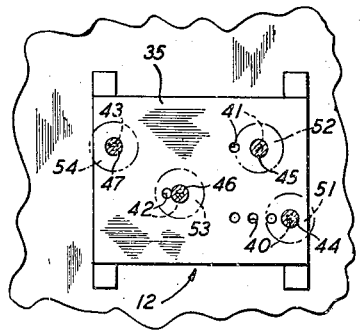
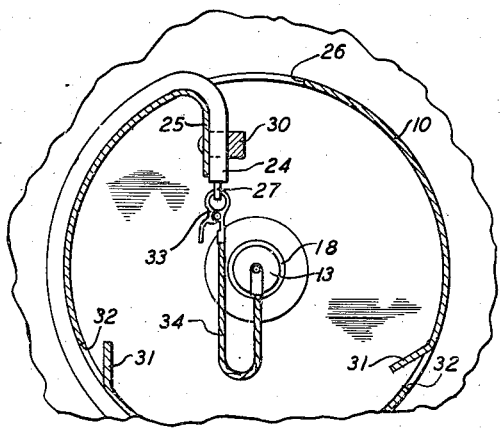
INVENTOR
W. D. BOYNTON
BY
ATTORNEY Patented July 19, 1949

2,476,278

UNITED STATES PATENT OFFICE 2,476,278

APPARATUS FOR TESTING CONDUCTORS

Wentworth D. Boynton, Woodbrook, Md., assignor to Western Electric Company, Incorporated, New York, N. Y., a corporation of New York Application October 3, 1944, Serial No. 556,964

2 Claims. (Cl. 175—183)

This invention relates to apparatus for testing conductors, and has for its object the provision of new and improved apparatus for testing conductors.

One apparatus embodying the invention includes means for advancing an insulated conductor, means for flexing an insulated conductor advanced by the advancing means, and means for testing an electrical characteristic of the conductor as it is flexed.

A complete understanding of the invention may be obtained from the following detailed description of a specific embodiment thereof, when read in conjunction with the appended drawings, in which:

Fig. 3 is a vertical sectional view taken along line 3—3 of Fig. 2;

Fig. 4 is an enlarged, fragmentary, vertical sectional view taken along line 4—4 of Fig. 1, and Fig. 5 is an enlarged, fragmentary, vertical sectional view taken along line 5—5 of Fig. 3.

Figures 1, 2:
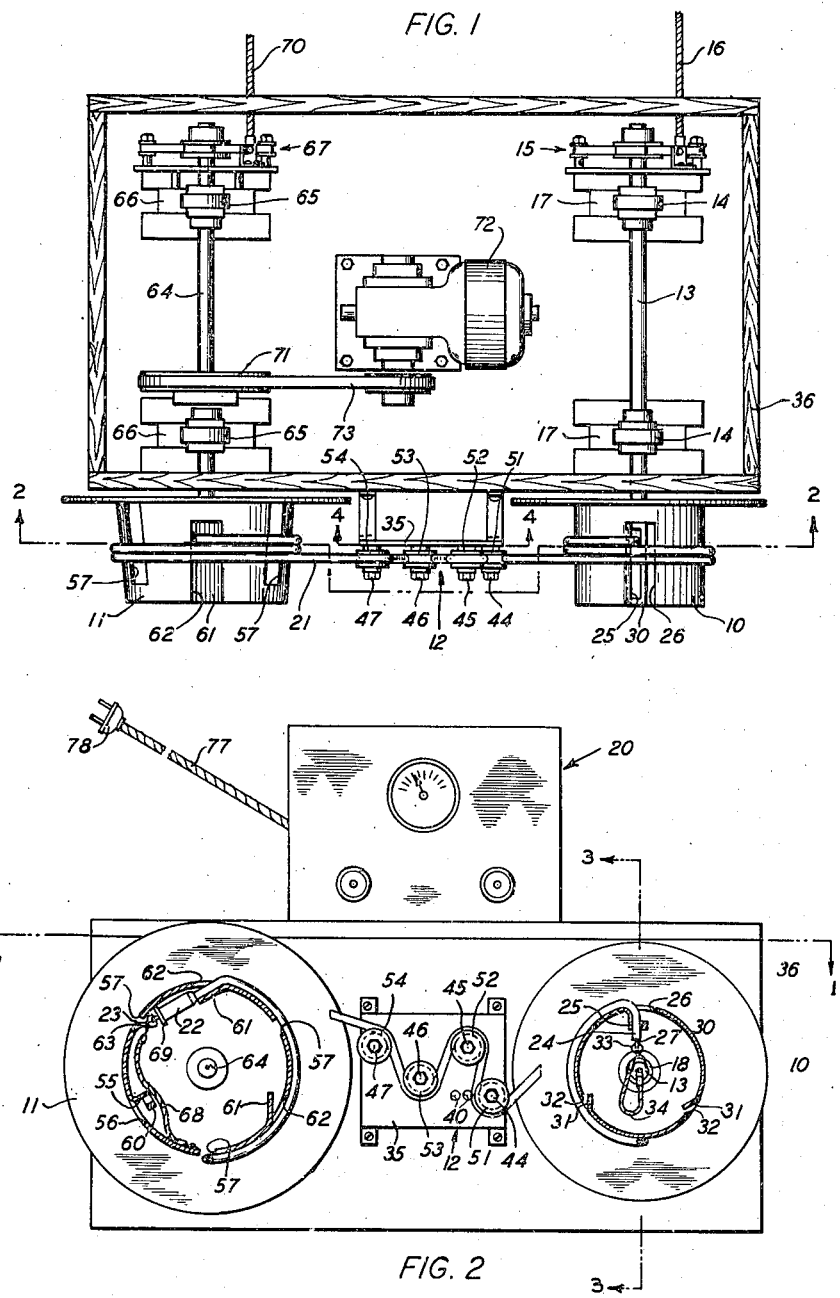
Fig. 1 is a horizontal sectional view of an apparatus embodying the invention, the section having been taken along line 1—1 of Fig. 2.
Fig. 2 is a vertical sectional view taken along line 2—2 of Fig. 1.

Referring more in detail to the drawings, there is shown therein an apparatus for testing the continuity of conductors while the conductors are flexed and are placed under tension. This apparatus includes a flanged supply drum 10 (Fig. 1), a flanged and tapered take-up drum 11, and a flexer 12 positioned between the drums 10 and 11. The supply drum is fixedly positioned on a shaft 13 and is insulated therefrom by a bushing 18 of electrical insulating material. The shaft 13 is rotatably mounted in bearings 14—14, which are supported by standards 17—17 formed of suitable electrical insulating material. A slip ring assembly 15 (Fig. 1) serves to connect electrically the shaft 13 and an insulated conductor 16, which leads to a test set 20 of standard construction, which is designed to indicate any lack of continuity in a conductor being tested.

One type of a coaxial cable which can be tested by the apparatus embodying the invention is a coaxial cable 21 (Fig. 1), which has a terminal 22 from which projects a post 23 electrically connected to an end of a central conductor 27 of the cable. The cable 21 also includes an unterminated end 24 from which the other end of the conductor 27 projects. The supply drum 10 (Fig. 5) has a bent-in flange 25 and an opening 26 formed therein adjacent to the flange 25. The unterminated end 24 of the cable is positioned between the flange 25 and a U-shaped clamp 30 secured to the flange, whereby the cable is secured to the drum 10 by the flange and the clamp. The clamp 30 does not clamp the unterminated end 24 positively to the drum 10, but the sharp radius of the bent-in flange 25 acts as a snubber for the end of the cable and, with the clamp 30 serves to secure the end 24 in the position shown in Fig. 5.

A clip 33 (Fig. 2) serves to connect one end of the central conductor 27 to a conductor 34 which is electrically connected to the shaft 13. Thus, the conductor 27 is connected to the test set 20 through the clip 33, the conductor 34, the shaft 13, the slip ring assembly 15, and the insulated conductor 16.

The flexer 12 (Fig. 2) includes a plate 35 secured to a housing 36 formed of an insulated material. The plate 35 is provided with bores 40—40, 41—41, 42—42 and 43 (Fig. 4). A pin 44 may be secured in any of the bores 40—40, a pair of pins 45 and 46 may be secured in any of the bores 41—41 and 42—42 respectively, and a pin 47 is secured in the bore 43. The pins 44, 45, 46 and 47 serve to mount grooved rollers 51, 52, 53 and 54 respectively, rotatably on the plate 35. When the cable 21 is advanced over the grooved rollers 51 and 52 from the supply drum 10 to the take-up drum 11, it is bent over a short radius, whereby it is tensioned. The rollers 52, 53 and 54 serve to flex the cable 21 as it is advanced thereover. By positioning the pins 44, 45 and 46 in different ones of the bores 40—40, 41—41 and 42—42, respectively, the tortuousness of the path provided by the rollers can be varied, whereby the degree of flexing and the amount of tension placed upon the cable 21, as it is drawn thereover, can be varied.

The take-up drum 11 (Fig. 2) has openings 57—57 extending across the width thereof and is provided with a pair of bent-in flanges 61—61 (Fig. 2) forming open-ended slots 62—62. Each of the flanges 61—61 is designed to secure a terminal of a cable to the drum 11. This is illustrated in Fig. 2, in which the terminal 22 is slid through the slot 62 and is held against the interior surface of the drum 11 by the flange 61. A collared portion 69 of the terminal 22 is held against the interior surface of the drum 11 by the flange 61 and cannot be drawn through the slot 62. A clip 63 (Fig. 2), through a conductor 68, serves to connect the post 23 to the take-up drum 11.

The drum 11 (Fig. 1) is fastened to a shaft 64, which is rotatably mounted in bearings 65—65 mounted on standards 66—66 made of electrical insulating material. A slip ring assembly 67 serves to connect the shaft 64 to an insulated conductor 70, which is connected to the test set 20. The test set 20 is provided with a cord 77 having a plug 78 on the end thereof, which may be connected to a source of electrical power (not shown).

A circuit to the test set 20 is formed through the conductor 16, the slip ring assembly 15, the shaft 13, the conductor 34, the clip 33, the central conductor 27, the post 23, the clip 63, the conductor 68, the take-up drum 11, the shaft 64, the slip ring assembly 67, and the conductor 70, whereby the test set 20 may be operated to test the continuity of the conductor 27. The test set 20 (Fig. 2), when energized from a suitable source of power (not shown), serves to supply an electrical current to the conductor 27 and also serves to measure the amount of current passing therethrough. If no current passes through the conductor 27, the test set indicates that fact, whereby an operator of the device may be appraised that the conductor is defective.

The flexer 12 (Fig. 2) serves to open up any discontinuities in the conductor 27 as the portion of the conductor having a discontinuity therein is tensioned and flexed by the flexer, whereby the test set 20 indicates the presence of the discontinuity in the portion of the conductor being flexed. Thus, the discontinuity may be located.

A pulley 71 (Fig. 1) rigidly secured to the shaft 64 is driven by an electric motor 72 through a belt 73. The pulley serves to rotate the shaft 64 so as to rotate the take-up drum 11 and draw the cable 21 from the supply drum 10 through the flexer 12.

In the operation of the apparatus described hereinabove the unterminated end 24 of the cable 21 is secured to the supply drum 10 by the flange 25 and the clamp 30, which snub the cable, and the clip 33 is secured to the adjacent end of the conductor 27. The cable 21 then is wound upon the supply drum 10 except for the portion of the cable adjacent to the terminal 22, which is guided over the sheaves 51, 52, 53 and 54, as shown in Fig. 2, and is slid into one of the slots 62—62 in the take-up drum 11 to secure the terminal to the take-up drum.

The clip 63 then is connected to the post 23, the test set 20 then is operated to supply a current through the conductor 27, and the motor 72 is started, whereby the cable 21 is advanced from the supply drum 10 and through the flexer 12, and is wound upon the take-up drum 11 in even neat coils. After the cable 21 has been wound completely on the take-up drum 11, an operator passes the ends of a tying cord (not shown) through the opening 57 and around the coils of the cable 21, after which the ends of the cord are tied to secure the cable in its coiled position. The coiled cable then is slid off the tapered take-up drum 11 and the operation described hereinabove can be repeated upon another cable.

The apparatus described hereinabove also can be used to test both cables of a type having terminals on both ends thereof and cables of a type having a terminal on neither end. If a cable of the type having no terminals is tested, one of the unterminated ends thereof is secured to the supply drum by the flange 25 and the clamp 30 and the other unterminated end is secured to the take-up drum 11 by a flange 55 and a clamp 60 formed on the take-up drum. The flange 55 is identical with the flange 25 and the clamp 60 is identical with the clamp 30.

If a cable of the type having terminals on both ends is tested, one of the terminals is slid into one of a pair of slots 32—32 (Fig. 2) formed in the supply drum 10 and is secured to the supply drum by an adjacent flange 31. The flanges 31—31 and slots 32—32 are identical with the flanges 61—61 and slots 62—62, respectively. The other terminal is secured to the take-up drum 11 in a similar manner by one of the flanges 61—61. The collars of the terminals ordinarily are connected to a conductor of the cable other than and insulated from the central conductor. But the circuit from the collar of the terminal on the take-up drum to the shaft 13 is broken since the shaft 13 is insulated from the supply drum 10 by the bushing 18. Consequently, the fact that the collars of the terminals are in contact with the drums 10 and 11 while the central conductor is tested does not interfere with the test of the central conductor.

The apparatus described hereinabove serves to test the continuity of conductors while the conductors are flexed and under tension, and does so in a rapid and facile manner. As described hereinabove, the elements of the flexer 12 may be adjusted to apply varied amounts of tension and flexing to cables drawn therethrough, thereby adding a large degree of flexibility to the apparatus.

What is claimed is:

1. In an electrical testing apparatus, a supply drum for holding a supply of an insulated conductor, a take-up drum for advancing from the supply drum an insulated conductor held by the supply-drum, a plurality of sheaves, means for mounting the sheaves in staggered relationship between the supply drum and the take-up drum to form a tortuous path along which the conductor is advanced, whereby the conductor is flexed and tensioned, a test set, and means including contactors on the supply drum and the take-up drum for connecting the ends of the conductor to the test set.

2. In an electrical testing apparatus, a supply drum for holding a supply of a coaxial cable, said supply drum being provided with means for securing thereto an end of a coaxial cable held thereby, a tapered take-up drum having means for securing the other end of the coaxial cable thereto, means for rotating the take-up drum to advance the cable from the supply drum to the take-up drum and coil the cable on the take-up drum, said take-up drum having a slot therein, whereby a cord may be tied around the coils of the cable on the take-up drum, a plurality of grooved rollers, means for mounting the rollers in a predetermined staggered relationship to provide a tortuous path for the cable as it is advanced to the take-up drum, whereby the cable is tensioned and flexed, means for varying said predetermined staggered relationship of the rollers, a test set for locating discontinuities in a central conductor of the cable, and means including contactors on the supply drum and the take-up drum for connecting the ends of the central conductor of the cable to the test set.

WENTWORTH D. BOYNTON.

REFERENCES CITED

The following references are of record in the file of this patent:

UNITED STATES PATENTS

| Number | Name | Date |
|---|---|---|
| 245,567 | Sawyer | Aug. 9, 1881 |
| 284,138 | McElroy | Aug. 28, 1883 |
| 1,445,260 | Adams | Feb. 13, 1923 |
| 1,782,397 | Adams | Nov. 25, 1930 |
| 1,882,815 | Haegele et al. | Oct. 18, 1932 |
| 1,927,045 | Parsons | Sept. 19, 1933 |
| 1,956,806 | Metzen et al. | May 1, 1934 |
| 1,961,755 | Foster | June 5, 1934 |
| 1,967,296 | Dixon et al. | July 24, 1934 |
| 2,092,439 | Bouhuys | Sept. 7, 1937 |
| 2,292,549 | Simmons, Jr. | Aug. 11, 1942 |

FOREIGN PATENTS

| Number | Country | Date |
|---|---|---|
| 121,204 | Great Britain | Dec. 12, 1918 |